United States Patent [19]

Gutierrez Atencio

[11] 4,023,866
[45] May 17, 1977

[54] ICE BEARING

[76] Inventor: Francisco Jose Gutierrez Atencio, Estancia "Santa Maria", Estafeta Dr. Garcia, Diamante, Entre Rios, Argentina

[22] Filed: Feb. 22, 1974

[21] Appl. No.: 444,766

[30] Foreign Application Priority Data

Mar. 7, 1973 Argentina .......................... 246921

[52] U.S. Cl. .............................. 308/77; 308/1 R; 415/178; 415/500
[51] Int. Cl.$^2$ .................. F16C 1/24; F16C 17/02; F16C 17/08; F16C 37/00
[58] Field of Search .......... 62/354; 104/136; 308/1, 308/76, 77, 134.1, 135, 139, 160, 173, 175, 219, 241; 415/178, 500, 121

[56] References Cited

UNITED STATES PATENTS

| | | | |
|---|---|---|---|
| 1,238,431 | 8/1917 | Nylund | 104/136 |
| 2,385,247 | 9/1945 | Yeomans | 104/136 X |
| 3,191,398 | 6/1965 | Rader | 62/354 X |
| 3,233,556 | 2/1966 | McDonald | 104/136 |
| 3,343,495 | 9/1967 | Petrik | 104/1 A |

Primary Examiner—Robert J. Spar
Assistant Examiner—Howard Beltran
Attorney, Agent, or Firm—Fleit & Jacobson

[57] ABSTRACT

A thrust or support bearing arrangement with means for forming a frozen layer of lubricant thereon to define a reduced-friction running surface for a member to be supported thereby. The formation of a frozen layer of lubricant in sealing arrangements and the use of such bearings and seals in turbines or pumps are also described.

12 Claims, 11 Drawing Figures

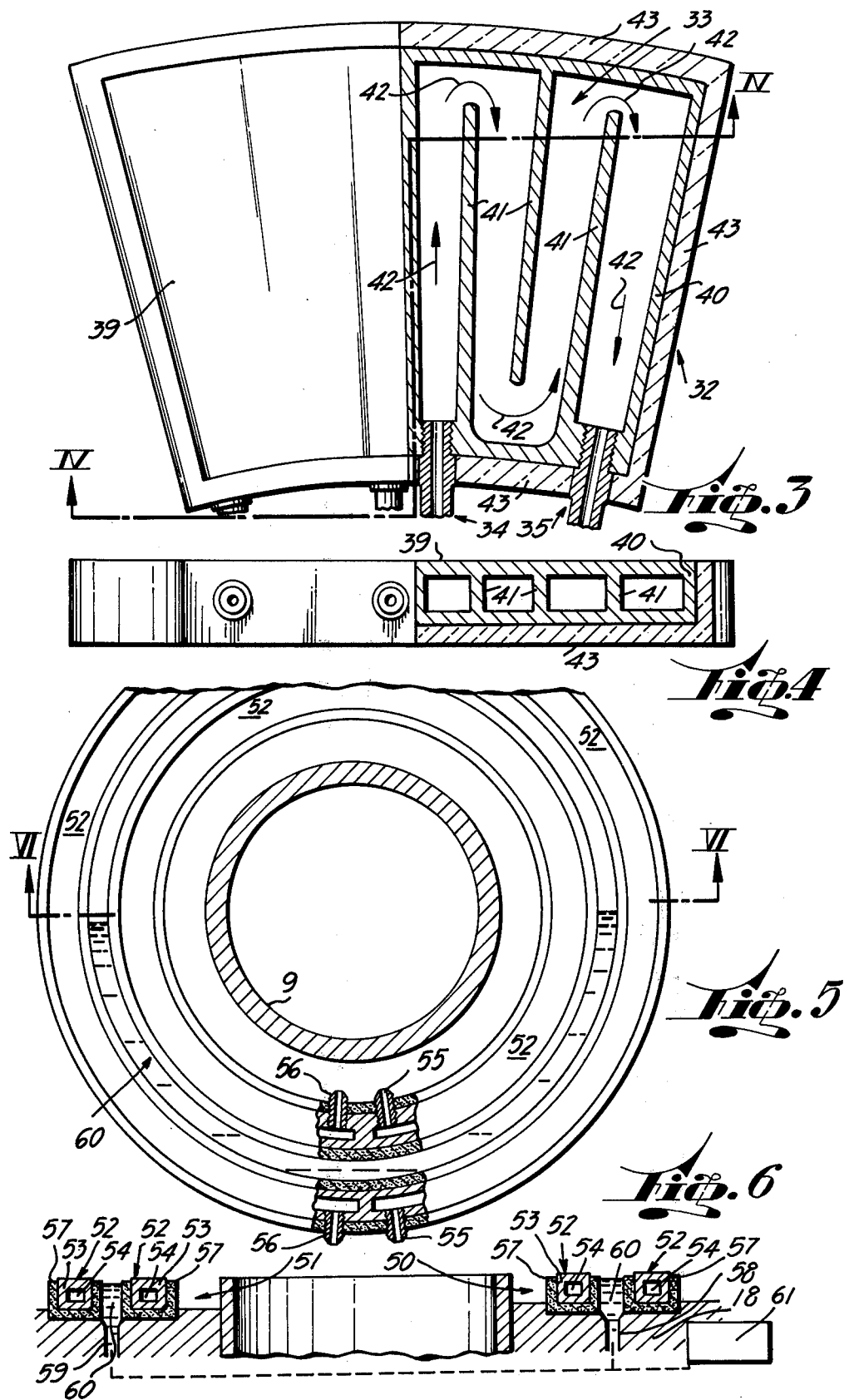

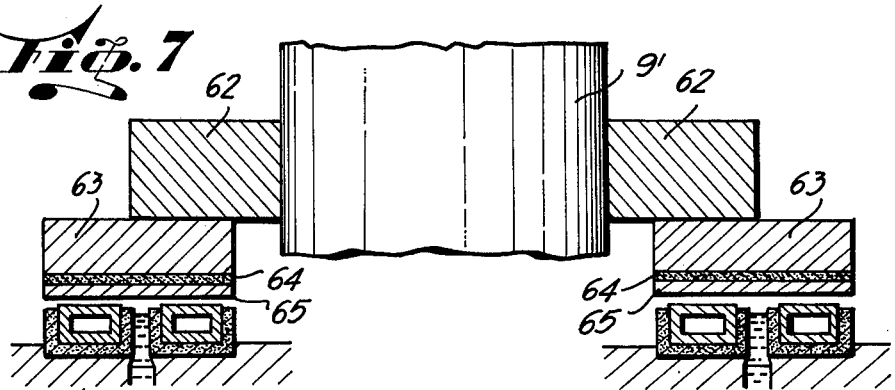
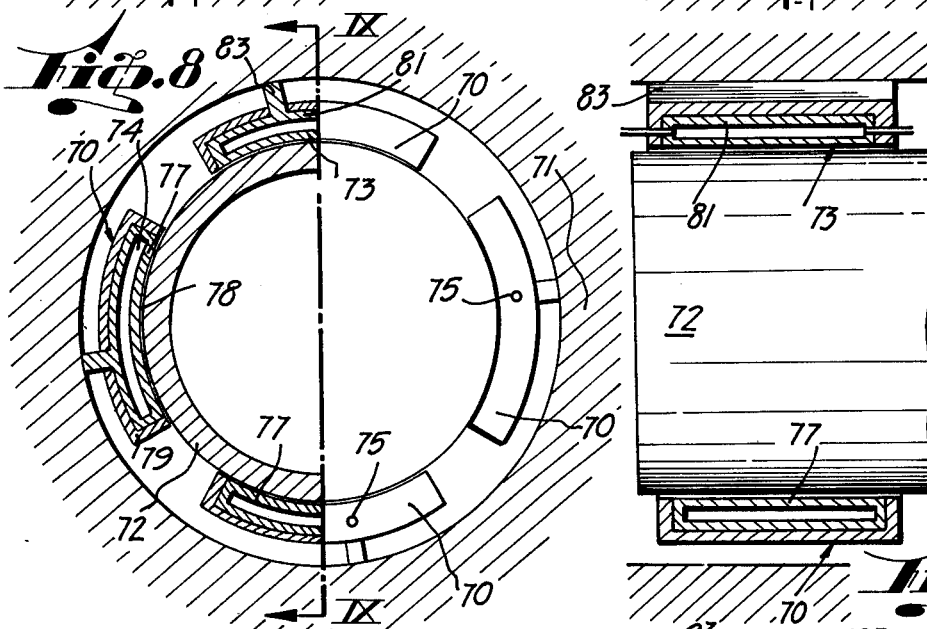
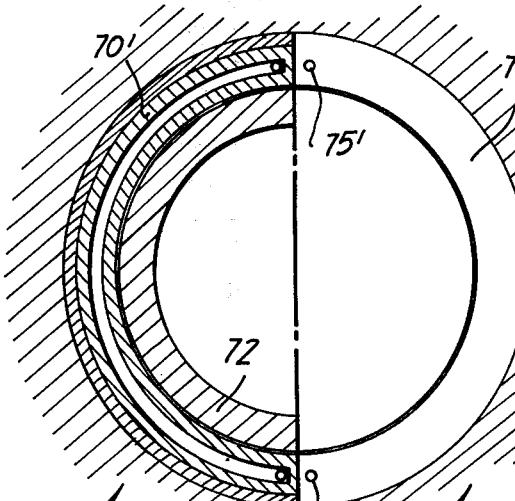
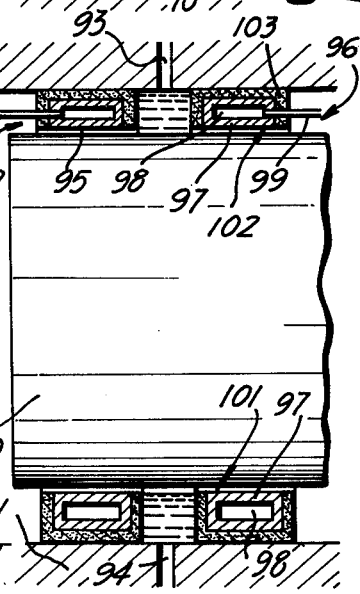

ICE BEARING

BACKGROUND OF THE INVENTION

1. Field of the Invention

The present invention relates to the formation of a frozen layer of fluid on bearing and seal surfaces and more particularly on thrust and support bearings and sealing rings preferably though not exclusively suited for use in easily lubricated environments such as for vertical and horizontal shaft turbines, pumps, impellers and the like.

2. Description of the Prior Art

Devices for frictionally supporting two relatively movable members are obviously well known. Amongst such devices thrust bearings and support bearings occupy an important position.

Thrust and support bearings for light equipment have reached a state of satisfactory perfection. However, the same cannot be said about bearings for heavy equipment, such as the thrust bearings for a 1000 Ton turbine rotor.

Known thrust and support bearings comprise an arrangement of pads or segments respectively, pivotally mounted generally about an eccentric or concentric axis and positioned around the shaft of the device to be supported, such shaft being integral with a ring or spider defining a glass polished friction surface arranged to contact and slide over the also smooth and flat surfaces defined on the pads or segments. Such bearings although adequate, leave room for improvement. However, the difficulty in arriving at efficient structures for thrust bearings resides in the delicate mechanical mounting (pivots, plural disc support structures, etc.) and adjustment of parts required so that all the pads support the same load, for which they must be maintained in a perfectly flat horizontal plane in spite of loads and thermal gradients. In the case of support bearings the arcuate segments also require precise mounting techniques which have led research towards other structures.

In the case of the pads of a thrust bearing or the arcuate segments of a support bearing, the running surfaces are usually of thick mild-steel plate thoroughly annealed, tinned and lined with hard (tin base) white metal. Utmost care is necessary to secure adhesion at all points to which effect electrical conductivity tests must be performed. Thickness of the white metal must be restricted to 0.05 ins, to avoid thermal distortion. The surfaces are finish machined after metalling.

These known arrangements have not only the just mentioned drawbacks but also those tied to the necessity of providing:

a. Costly lubricating systems for maintaining a lubricant permanently between the surfaces in frictional contact;

b. The lubricant itself;

c. Safety devices such as fire extinguishing equipment due to the possibility of combustion of the lubricants;

d. Periodical stoppage to service unevenly worn or thermally distortioned pads and segments; and e. Complicated pivoted supporting structures including hydraulic pistons or jack screws for equalizing the load on each pad or segment inasmuch as uneven loading causes not only uneven wear between different pads but also deflection of the pads themselves.

f. Discs between the pads and the pivots to cause a more even distribution of the load and reduce pad distortion;

g. Radially elongated pads which due to their radial dimension make it impossible to attain sufficiently flat surfaces.

The search for satisfactory bearing arrangements has been brought about by the continued increase in the demand for electric power, whereby hydroelectric plants have flourished and for economy the corresponding generators have had to grow to sizes far above even the most optimistic foresight of our predecessors. In this respect, the necessity of producing more power by means of a single unit has tended to a reduction of the rotational speed of turbines, thereby considerably increasing their physical size, as well as that of the rotating part of the generator. By the way of example, it is estimated that by 1980, 1,000,000 HP Francis units will be in production with runners of 15 m diameter and 6 m height. The corresponding generator will have an even larger diameter and weight twice as much whereby the combination of both will require a 3,000 Ton supporting thrust bearing so as to operate satisfactory.

There is an additional problem to be considered in the art of designing turbine components and it relates to the structure of the shaft. To date the turbine and the rotor of the generator have always been mounted on a costly and heavy shaft of forged steel and supported on one or more thrust bearings comprising oscillating pads annularly mounted about the shaft. In such arrangements the torsional forces are transmitted from the periphery to the centre of the runner of the turbine, along the shaft and then from the centre of the rotor of the genrator to the periphery. If an adequate thrust bearing arrangement were provided, it would be possible to replace the forged steel shaft by a tubular cone shaped shaft whereby the transmission of the torsional forces would be from the periphery of the runner directly to the periphery of the rotor of the generator, thereby reducing the weight of the arrangement, the manufacturing costs of the shaft, etc, particularly taking in consideration the limitations of available forging equipments. It is obvious that a shaft of laminated steel is of easier construction and requires less sophisticated technology than the construction of a delicately balanced solid shaft.

The provision of a hollow shaft affords the following advantages in addition to those already mentioned:

a. Less overall weight of the rotating parts, thereby reducing costs.

b. Air suctioning through the shaft so as to avoid caving-in at the turbine. Hydraulic stability ensures less stress on the turbine runner and higher efficiency.

c. Demounting of the runner through the rotor of the generator without demounting the latter.

d. A more compact turbine and generator design leading to a less deep perforation in the ground on which the hydroelectric plant is built, a less voluminous armoured cement structure and a lower overhead crane arrangement.

However, a hollow shaft of larger diameter than a solid steel shaft requires that the thrust bearing be removed from its conventional position around the shaft and placed near the centre line of the rotor of the generator.

This solution has been held so far to be impractical and only becomes feasible with the bearing arrangement of the present invention.

Although reference has been made so far to bearing arrangements, it is also of importance to note that sealing devices, such as sealing rings for sealing-off one axial portion of a space between two relatively movable cylindrical nested members, from another axial portion of that space, are also well known in the art, and although they serve their function satisfactorily, it is known that in order to obtain precisely coinciding frictional sealing contact between one of said members and the sealing device, it is necessary to provide extreme manufacturing accuracy.

SUMMARY OF THE INVENTION

In accordance with the present invention, there is formed, on the friction surface of a bearing arrangement, a frozen layer of lubricant. To this effect the pads or rings of the bearing arrangement are caused to be hollow, whereby a refrigerant which is made to flow therethrough freezes the lubricant normally present on the friction surface.

The frozen layer of lubricant thus formed defines a glass smooth friction surface which becomes liquified due to the friction between the frozen lubricant and the movable member it supports, thereby maintaining a self lubricating surface and causing, in addition, the permanent extraction of heat, caused by friction, through the pad and the refrigerant liquid whose temperature can be more readily controlled than that of the lubricant. In summary, in accordance with this invention the extraction of friction heat is done through the refrigerant and not only through the lubricant as is conventional in the art.

The layer of re-liquified lubricant is kept at nearly freezing temperature whereby the amount of re-liquified lubricant is just sufficient to maintain a perfectly smooth sliding or friction surface.

It has been found that the teachings of the present invention can be also applied to the formation of a simpler and more precise sealing surface on sealing arrangements provided for establishing a sealing relationship between a movable component and a stationary structure by forming a frozen layer of lubricant on said sealing surface.

BRIEF DESCRIPTION OF THE DRAWINGS

FIG. 3 shows a single thrust pad, half in plan view and half in horizontal section. Although in all its fundamental aspects, the thrust pad of FIG. 3 coincides with the thrust pads of FIG. 2 the position of the inlets and the outlets for the refrigerant are different.

FIG. 4 is a cross section along axis IV—IV of FIG. 3.

FIG. 5 is a top plan view of an alternative thrust bearing in accordance with the present invention and showing the shaft and part of the thrust supporting segments in section.

FIG. 6 is a sectional view of the arrangement of FIG. 5 as seen along axis VI—VI.

FIG. 7 is a schematic representation of a shaft, for example for a turbine with its associated supporting arms and thrust bearing arrangement, the latter being shown in vertical section.

FIG. 8 is a schematic representation of a support bearing arrangement for a rotary horizontal shaft, the left hand portion of this figure being a diametral cross section taken perpendicularly to the axis of the shaft while the right hand portion being a axial plan view.

FIG. 9 is a cross section as seen along axis IX—IX of FIG. 8.

FIG. 10 is a schematic representation of an alternative support bearing arrangement for a rotary horizontal shaft, the left hand portion of this figure being a diametral cross section taken perpendicularly to the axis of the shaft while the right hand portion being an axial plan view.

FIG. 11 is a schematic diametral axial section through a support bearing arrangement, and a seal arrangement also incorporating the teachings of the present invention.

DESCRIPTION OF THE PREFERRED EMBODIMENTS

Figure 1:
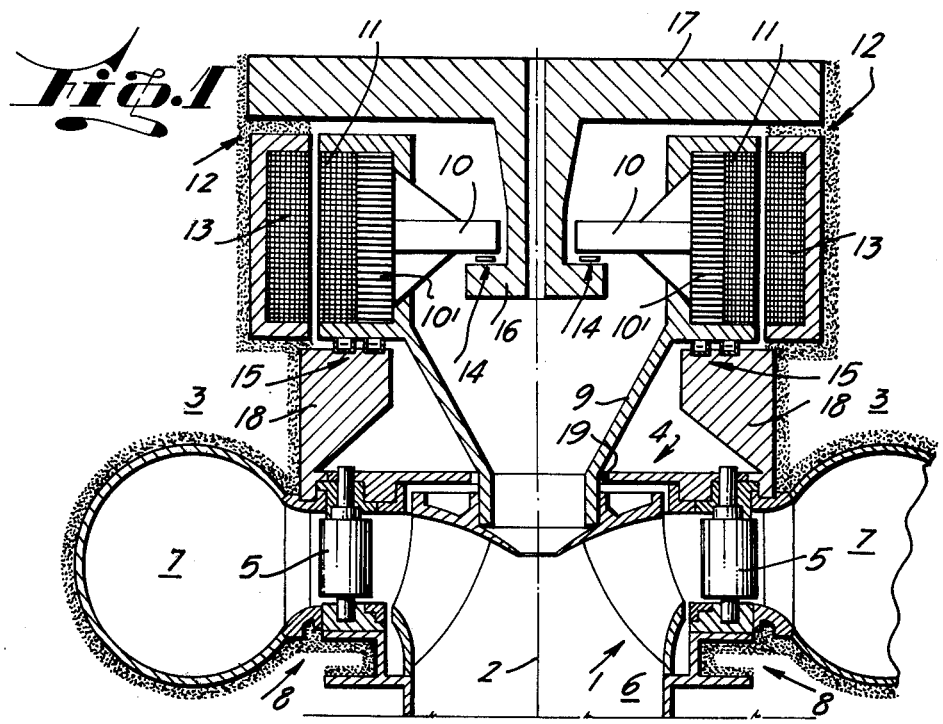
FIG. 1 is a schematic diametral axial section through a hydroelectric (turbine-generator) arrangement incorporating the teachings of the present invention.

Referring in first place to FIG. 1, there is schematically represented a Francis turbine comprising a runner 1 rotatably mounted about an axis 2 and surrounded by a stationary structure 3 comprising a head cover arrangement 4 integral with the structure for supporting a wicket gate 5 communicating the draft tube 6 with the spiral tube 7. Wicket gate 5 is also supported by bottom ring arrangement 8 integral with stationary structure 3.

Runner 1 is mechanically integral with hollow generally frustum shaped shaft 9 of laminated steel and comprising a structural portion 10 consisting of radial arms on which is mounted the annular magnetic wheel 10' and the poles of the rotor 11 of a generator 12 also comprising stator windings 13 supported by stationary structure 3.

Runner 1 and rotor 10,10', 11 are frictionally supported either on bearing arrangement 14 or on bearing arrangement 15, the former resting on a protruding portion 16 of a support structure 17 and the latter resting on a support structure 18. Bearing arrangements 14 and 15 can either be of the ring or pad types.

Runner 1 is also guided by a support bearing 19 mounted in head cover 4 and in frictional contact with a cylindrical portion of shaft 9. Means are provided, not shown in FIG. 1, for feeding a lubricant (for example, water, oil, grease) to the bearing arrangements 14, 15 and 19 just mentioned.

Not only due to cost factors, it is known as pointed out previously, that the use of water as a lubricant affords substantial benefits. In this respect, water has a low coefficient of viscosity, high thermal capacity, is physically and chemically stable and is not inflammable and therefore, represents possibly the best lubricant available at least for turbines and pumps. However, water lubrication was used in the 1930's in turbines of up to 30,000 HP. As the power and accordingly the weight of these machines grew, it was no longer possible to use water lubricated wood bearings and oil lubricated metal bearings began to be necessary because of their more compact construction. However, it has so far not been possible to use water lubricated metal bearings because they would require excessively large bearing surfaces.

Now, and in accordance with the present invention, it is suggested to form a frozen layer of lubricant (i.e. water) on the frictional surfaces of the bearings to which effect various means are provided for (a) feeding the lubricant to the bearings; and (b) feeding a refrigerant to the bearing to freeze the lubricant thereon. The first means can comprise a pump and filter arrangement for taking in cold water at near 0° C from a special supply; and feeding it to bearing arrangements 14, 15 or 19 by an independent piping network arrangement.

To more clearly understand the specific teachings of the present invention, reference will now be made to a possible embodiment for bearing arrangement 14 and which has been shown in FIG. 2. It is to be understood that this specific structure, although described in connection with bearing arrangement 14 in FIG. 1, can be equally well suited for a bearing in any other position both in a turbine or pump arrangement, as well as in any other arrangement requiring a thrust bearing.

Figure 2:
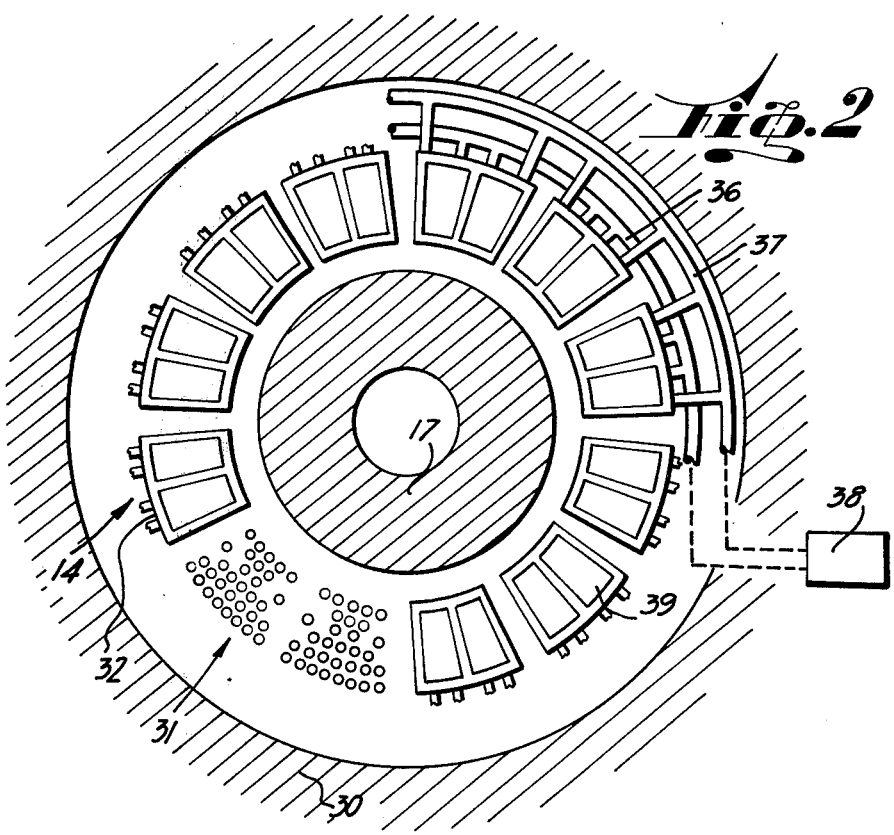
FIG. 2 is a schematic top plan view of a thrust bearing arrangement in accordance with the present invention and wherein two thrust pads have been omitted so as to show their spring mountings; the axle and casing of the arrangement have been shown in section.

In this FIG. 2, there has been shown a spring supported thrust bearing arrangement comprising an outer stationary structure 30 supporting in a conventional way a plurality of annularly disposed springs 31 forming a plurality of groups, each group having a fan shaped supporting member or thrust pad 32 positioned thereon. In this way, a plurality of thrust pads 32 are circumferentially arranged about axis 2 of shaft 9. It is known in the art that the normal loading of a thrust pad is 400 to 450 lb. per square inch (of the total area of the pads), and that the pads should be separated by at least one-fifth of their mean width inasmuch as it is well established that improved lubrication more than compensates for the loss of pad area.

However, by following the teachings of the present invention, it is possible to reduce pad separation thereby increasing pad area, without affecting lubrication, which makes the pads be subject to less severe operating conditions.

The thrust pads 32 can either be supported on a mattress of springs 31 or else on individual adjustable jack-screws (not shown) which act as pivots for the pads or else directly on rubber blocks inasmuch as due to the provision of the frozen layer of lubricant (to be described) on the pads, the precision normally required in mounting these pads is considerably reduced. If supported on jack-screws, such pivots are placed slightly ahead of the centre of the area of the pad, to facilitate the formation of a liquified lubricant wedge. In reversible bearings the supports must, of course, be central, thereby requiring a small reduction in loading. (Guthrie Brown).

However, it has been found that pivoted pads are not indispensable inasmuch as any necessary oscillation of the pads is compensated by variations in the thickness of the layer of ice.

Now, in accordance with the present invention, pads 32 are hollow and in the embodiment of FIG. 2 each define two interior hermetic chambers 33 (only the right hand one is shown in FIG. 3), each having an inlet 34 and an outlet 35 communicating the interior of the chambers with the exterior thereof. Each inlet 34 is normally connected to an inlet manifold 36 while each outlet 35 is normally connected to an outlet manifold 37, both manifolds 36, 37 being connected to a source 38 of refrigerant such as brine, chloride calcium solution, refrigerated mercury or any other refrigerant fulfilling the requirements which will become obvious from the teachings of the present invention. Source 38 feeds the refrigerant to said chambers 33 through the inlet manifold 36 and inlets 34 and receives the spent refrigerant from chambers 33 once it has circulated therethrough, through the outlets 35 and outlet manifold 37.

Briefly, and during use, the exterior of the pads 32 bearing of the present invention will be permanently supplied with a lubricant such as water which due to the circulation of a refrigerant at a temperature below the freezing point of the lubricant, through the interior of pads 32, becomes frozen on the flat upper faces 39 of pads 32, thereby defining a substantially flat running or support surface of reduced friction, generally perpendicular to axis 2.

To this effect, and as shown in FIG. 3, each pad 32 comprises a hollow body member 40 of good heat transmitting material such as copper and defining two interior hermetic chambers 33. Means such as walls 41 are incorporated within chambers 33 for providing an extended path for the flow of refrigerant therein. Walls 41 are dimensioned to define a tortous path for the flow of refrigerant from inlet 34 to inlet 35 which is considerably longer than the physical distance between the mentioned inlet and outlet. This extended path has been shown by arrows 42.

So as to cause the formation of a frozen layer of lubricant substantially only on face 39 of body member 40, the latter is made of good heat transmitting material (high thermal conductivity) such as copper and surrounded exteriorly, such as on all sides of pad 32, excepting the portion corresponding to face 39, by a layer 43 of a mechanically resistant, thermally insulating material such as wood or polyamide resin having a lower thermal conductivity coefficient than that of the good heat transmitting material of body member 40. It is also contemplated, in place of the structure just described, to make body member 40 in such a way that the wall portion thereof defining face 39, has a higher thermal conductivity coefficient than the remainder of the pad thus eliminating the necessity of an exterior means 43 for reducing the overall thermal conductivity coefficient of the lateral and bottom walls of pads 32. To this effect, the upper wall of pad 32 could be of copper and the lateral and bottom walls of wood or plastic.

In the embodiment of FIG. 3 which shows a pad 32 which differs slightly from the pads shown in FIG. 2, (in the former the inlet and outlets are defined in the radially innermost lateral face of the pad while in the latter they are defined in the radially outermost face of the pad), such inlet 34 and outlet 35 comprises a conduit member screwed into body member 40 and comprising an outwardly projecting portion adapted to be connected to a flexible member (not shown) which acts as an intermediary between the inlet 34, outlet 35 and manifolds 36, 37 to enable movement of the pads with respect to the manifolds.

Reference will now be made to the embodiment of FIGS. 5 and 6, which shows bearing arrangement 15 of FIG. 1 in more detail. Obviously, although this embodiment has been represented in FIG. 1 in a specific position, it can just as well be placed, not only in the position corresponding to bearing arrangement 14 but also in any other structure requiring a thrust bearing arrangement.

In the specific embodiment shown, thee is an annular, inner thrust supporting member 50 and an annular, outer, thrust supporting member 51, both being concentrically arranged about shaft 9 and defining individual substantially flat surfaces 52 generally in a single plane and perpendicular to axis 2 (FIG. 1) of shaft 9. Each annular thrust supporting member 50, 51 comprises a hollow, annular body member 53 of good heat transmitting material (copper) and defining an interior hermetic chamber 54. Chamber 54 has at one end an inlet 55 and at its other end an outlet 56 both in communication with chamber 54. Both inlet 55 and outlet 56 are defined by a conduit member screwed into body member 53 and each comprise a radially projecting portion adapted to be connected to a respective flexible member (not shown) which acts as an intermediary between inlet 55, outlet 56 and the manifolds (not shown, but which are equivalent to manifolds 36, 37 of the embodiments previously defined) which enable any slight movement or vibration of the pads annular supporting members with respect to the manifolds. As in the case of the previous embodiments, a source of refrigerant is also provided to feed a refrigerant to chamber 54 and receive spent refrigerant therefrom, once it has circulated therethrough.

Body members 53 are somewhat thermally insulated on substantially the entire exterior thereof, excepting the wall portion defining flat surfaces 52, by means 57 comprising a layer of material having a lower thermal conductivity coefficient than the good heat transmitting material of body member 53 and secured to body 53. Both thrust supporting members 50, 51 are supported through heat insulating material 57 on support structure 18.

It will be obvious to those skilled in the art that in place of body member 53 being of good heat transmitting material and being nearly totally surrounded by what could be considered in this particular invention as a heat insulator, whether the material used is or not a conventional heat insulator, it is possible to directly make body member 53 of two materials, one of high thermal conductivity for forming that wall portion which defines flat surface 52 and another of lower thermal conductivity for the lateral and bottom walls of supporting members 50 and 51.

As is shown in FIG. 6, support structure 18 has two diametrically opposite lubricant supply conduits 58 and 59 defined therein and in communication with a ring shaped space 60 defined between adjacent and facing portions of heat insulating means 57 of annular thrust supporting members 50, 51. As schematically represented in FIG. 6, conduits 58 and 59 are connected to means 61 for feeding a lubricant (preferably water) into space 60 and causing lubricant to flow over the noninsulated portion (surface 52) of body member 53.

In this way and due to the flow of refrigerant through chamber 54 the lubricant will become frozen on surfaces 52 thereby defining a truly flat reduced friction support surface. Reference will now be made to FIG. 7 in which the embodiment of FIGS. 5 and 6 is shown in combination with an alternative shaft arrangement comprising a conventional shaft 9' provided with an annular support 62 integral therewith, ending in an annular enlarged portion 63 resting on a heat insulating layer 64 sandwiched between said annular enlarged portion 63 and friction component 65. The bearing arrangement in itself, is identical to that shown in FIGS. 5 and 6 previously described. The benefits achieved by this structure over thrust bearings with support pads are:

simplicity;
adaptability to lower speeds;
adaptability to higher thrust loads.

Reference will now be made to the embodiments of FIGS. 8 and 9 which show the use of the teachings of the present invention in a support bearing for a horizontal shaft such as support bearing 19 of FIG. 1. Obviously, support bearings constructed in accordance with the present invention can be incorporated not only in turbines, in the position shown in FIG. 1, but also in any other type of equipment requiring the provision of a bearing arrangement for supporting a rotatable shaft with respect to a stationary structure.

The bearing arrangement shown in FIGS. 8 and 9 comprises a plurality of arcuately shaped, spaced apart supporting members or pads 70 circumferentially arranged about a stationary structure 71 to which each of pads 70 is pivoted as will be described in more detail later on. Pads 70 define a substantially cylindrical inner space receiving a shaft 72 which is to rotate with respect to stationary structure 71. Each supporting pad 70 comprises a hollow body member 73 of good heat transmitting material and defining an interior hermetic chamber 74. Chamber 74 has at one axial end an inlet 75 and at its other axial end an outlet 76 (FIG. 9), both in communication with chamber 74. The structure of inlet 75 and outlet 76 can be identical to that of inlets 34 and 35 previously described in FIG. 3 and are also connectable through a flexible intermediary to inlet and outlet manifolds (not shown) in turn connected to a source of refrigerant to feed refrigerant to chamber 74 and receive spent refrigerant therefrom, once it has circulated therethrough.

Body members 73 are somewhat thermally insulated on substantially the entire exterior thereof, excepting the wall portion 77 defining arcuate surfaces 78, by means 79 comprising a layer of material secured to body 73 and having a lower coefficient of thermal conductivity that the material of body 73.

Body members 73 are formed by laterally soldering one against another a plurality of open ended, curved, brass pipes of rectangular cross section. This structure is completed by two hollow head pieces communicating adjacent ends of the soldered pipes, one head piece having an inlet and the other an outlet for refrigerant. Body members 73 are supported on structure 83 comprising a block of wood resting on a layer of rubber. For rigid pads the layer of rubber can be avoided.

As in the previous embodiments described, in place of body member 73 being of good heat transmitting material and being nearly totally surrounded by a "heat insulator", it is possible to directly make the lateral and bottom walls of body member 73 of a material having a lower coefficient of thermal conductivity than the material of that portion which defines arcuate surfaces 78 which should be of higher thermal conductivity or, in other words, "non-insulated".

As stated hereinabove, means are provided for flowing a refrigerant through chambers 74, and for feeding a lubricant, preferably water, onto surfaces 78 whereby a layer of frozen lubricant (ice) is formed on these faces thereby defining a reduced friction support surface for shaft 72, this support surface being substantially cylindrically shaped and parallel to the axis of shaft 72.

Reference will now be made to FIG. 10 which shows an embodiment of the present invention, similar to that of FIGS. 8 and 9, but comprising only two annular supporting members 70', each extending over a peripheral ring portion of shaft 72. The remaining structure of this embodiment is analogous to the structure of the embodiments of FIGS. 8 and 9, excepting that supporting members 70' are rigidly secured to stationary structure 71 and that inlet 75' in circumferentially aligned with outlet 76. A single annular supporting member can replace members 70' in which case inlet 75' will be adjacent outlet 76.

Reference will now be made to FIG. 11 which shows a further use of the teachings of the present invention. In this respect, the formation of a frozen layer of lubricant on a supporting surface obviously causes a reduction of the clearance between such supporting surface and the surface supported thereby. If the supporting surface were to form part of a seal arrangement in place of a friction bearing, such formation of the frozen layer would reduce the clearance of the seal arrangement thereby increasing its efficiency without requiring any precise machining of the contact surfaces between the relatively movable parts. Any imperfection of the friction surfaces themselves would be absorbed by the frozen layer.

From the foregoing, it will become evident that the present invention, in addition to the advantages stated hereinbefore, reduces thermal gradients in the pads or segments and accordingly reduces thermal deformation thereof. In addition, any imperfection of the facing surfaces of the running and stationary components, as well as any excentricity, variation of loads, lack of flatness, parallelism, etc. at a certain zone is automatically compensated by an increase in the thickness of the frozen layer at that zone.

In FIG. 11, there is shown a rotatable shaft 90 and a stationary structure 91. A friction bearing in accordance with any of the previous embodiments is shown at 92 and lubricant supply conduits 93, 94 are defined in stationary structure 91. So as to cause the flow of a lubricant over the friction surface 95 of bearing 92, it is necessary to confine the lubricant to which effect a sealing arrangement 96 is provided which is structurally most similar to the bearings above described. Sealing arrangement 96 comprises a hollow ring shaped body 97 of good heat transmitting material and defining an interior hermetic chamber 98. Chamber 98 has an inlet 99 and an outlet (not seen) whose structure can be the same as that of inlet 55 and outlet 56 previously defined, and are also connectable through a flexible intermediary to a source of refrigerant (not shown) to feed refrigerant to chamber 98 and receive spent refrigerant therefrom, once it has circulated therethrough.

Body member 97 is "thermally" insulated on substantially the entire exterior thereof, excepting the wall portion 101 defining a cylindrical surface 102, by means 103 comprising a layer of material having a lower coefficient of thermal conductivity than the material of wall portion 101 and secured to body 97. In this embodiment of the invention, the alternative structures previously described for achieving the formation of a layer of frozen lubricant substantially only on surface 102 are also applicable.

In operation, a lubricant is fed through conduits 93, 94 into the space defined between bearings 92 and sealing arrangement 96, such lubricant, which in this case can be also water, will tend to flow over surfaces 95 and 102 on which it is frozen by the refrigerant flowing through the chambers defined in bearing arrangements 92 and sealing arrangement 96. In this way, the friction between surface 95 and the surface of axle 90 and the clearance between surface 102 and the surface of axle 90 will be reduced.

In connection with the thickness of the layer of ice to be formed, this is determined by considering the most unfavourable abnormal conditions such as overloads, interruptions in the in-feed of refrigerant, overspeeds. In the event of an interruption in the in-feed of refrigerant, the machine (turbine) will have to be halted prior to the layer of ice on the bearing surfaces being melted by the heat caused by friction. By way of example, if the coefficient of friction $\mu$ between the rotating surface and the layer of ice is 0.001, the pressure P which the rotating surface exerts on the ice is 100,000 Kg/m$^2$ and the relative lineal speed V between the surface and the ice is 10m/sec, then the heat $E_T$ generated by friction will be $$E_T = \frac{(\mu \cdot P) \times V}{E}$$

wherein
 $E$ is a conversion factor equal to 400 Kgm/$_{Kcal}$.
 In the case of the example given $$E_T = 2.5 \frac{Kcal}{sec.}$$

whereby 1 m$^2$ of ice will melt at a rate of 30 sec per mm thickness. If the time required to halt the movement of the machine is 120 sec it will be seen that the minimum thickness of the ice to assure the presence thereof, even at the instant the machine is detained, is 4 mm. This thickness of ice is between 20 and 40 times the possible deformations (0.1 mm) of the rotating surfaces of the machine and the variations in dimensions (0.2 mm) of these surfaces caused during breaking-in of the machine.

Possible imperfections of the bearing surfaces are compensated by increasing the thickness of the layer of ice by 10 percent (safety coefficient).

I claim:

1. A bearing arrangement for frictionally supporting a member rotatable about a predetermined axis comprising, a plurality of thrust pads circumferentially arranged about said predetermined axis, means for forming a frozen layer of a normally fluid lubricant on at least a part of said thrust pads to define a reduced friction support surface for the supported rotatable member extending substantially perpendicular to said axis whereby said arrangement operates as a thrust bearing.

2. A thrust bearing arrangement as claimed in claim 1, wherein each one of said thrust pads comprises a hollow body member of good heat transmitting material and defining an interior hermetic chamber; an inlet and an outlet in communication with said chamber; and means extending around substantially the entire exterior of said body member excepting a portion thereof, said means being of a material having a lower thermal conductivity coefficient than said good heat transmitting material; the arrangement further comprising an inlet manifold connected to each one of said inlets and an outlet manifold connected to each one of said outlets, and a source of refrigerant connected to said manifolds to feed a refrigerant to said inlet manifold and receive said refrigerant from said outlet manifold once it has circulated through said chamber, whereby said frozen layer of lubricant can be formed substantially only on said portion of the body member.

3. A thrust bearing arrangement as claimed in claim 2, wherein means are provided in said body member for causing said refrigerant to follow an extended path in said chamber.

4. A thrust bearing arrangement as claimed in claim 1, wherein each one of said pads comprises a hollow body member defining an interior hermetic chamber, a portion of said body member being of higher thermal conductivity than the remainder of said body member; said arrangement further comprising means for feeding a refrigerant into said chamber and for receiving said refrigerant from said chamber once it has circulated therethrough, whereby said frozen layer of lubricant can be formed at least on said portion of high thermal conductivity.

5. A thrust bearing arrangement as claimed in claim 4, wherein means are provided in said body member for causing said refrigerant to follow an extended path in said chamber.

6. A bearing arrangement for frictionally supporting a member rotatable about a predetermined axis comprising, a plurality of arcuately shaped, spaced-apart supporting pads circumferentially arranged about said axis, means for forming a frozen layer of a normally fluid lubricant on at least a part of said supporting pads to define a substantially cylindrically shaped, reduced friction support surface for the rotatable member extending parallel to said axis to thereby form a support bearing.

7. A support bearing arrangement as claimed in claim 6, wherein each one of said supporting pads comprises a hollow body member of good heat transmitting material and defining an interior hermetic chamber; an inlet and an outlet in communication with said chamber; and means extending around substantially the entire exterior of said body member excepting a portion thereof, said means being of a material having a lower thermal conductivity coefficient than said good heat transmitting material; the arrangement further comprising a source of refrigerant connected to said inlets and outlets to feed a refrigerant to said chamber and receive said refrigerant from said chamber once it has circulated therethrough, whereby said frozen layer of fluid is formed substantially only on said portion of the body member.

8. A support bearing arrangement as claimed in claim 6, wherein means are provided in said body member for causing said refrigerant to follow an extended path in said chamber.

9. A support bearing arrangement as claimed in claim 6, wherein each one of said pads comprises a hollow body member defining an interior hermetic chamber, a portion of said body member being of higher thermal conductivity than the remainder of said body member; said arrangement further comprising means for feeding a refrigerant into said chamber and for receiving said refrigerant from said chamber once it has circulated therethrough, whereby said frozen layer of fluid can be formed at least on said portion of higher thermal conductivity.

10. A support bearing arrangement as claimed in claim 9, wherein means are provided in said body member for causing said refrigerant to follow an extended path in said chamber.

11. A pad for bearing arrangement comprising a relatively small, hollow body having a continuous side wall and an interior defining a chamber, said body having a bearing surface disposed above the top of said chamber, an inlet and an outlet communicating the interior of said chamber with the exterior of said body, said hollow body having a wall portion composed of heat conducting material whereby circulation of a refrigerant through said chamber from said inlet to said outlet produces a frozen layer of lubricant on the external face of said wall portion to form said bearing surface and means for preventing the formation of a frozen layer of lubricant on the external face of another wall portion of said hollow body.

12. In a hydraulic turbine and pump comprising a thrust bearing arrangement, said thrust bearing arrangement comprising a plurality of circumferentially disposed thrust pads, each thrust pad comprising a hollow body defining a chamber, an inlet and an outlet communicating the interior of said chamber with the exterior of said member, a wall portion defining at least part of said body, said wall portion being of good heat conducting material, a source of refrigerant for feeding refrigerant into each one of said chambers through said inlet and receiving refrigerant from said chamber through said outlet, and means for feeding water onto said bearing pads to thereby cause the formation of a layer of ice on the external face of each one of said wall portions.

* * * * *